United States Patent
Park (10) Patent No.: US 9,674,181 B2
(45) Date of Patent: Jun. 6, 2017

(54) SURVEILLANCE CAMERA RENTING SERVICE

(71) Applicant: KT CORPORATION, Gyeonggi-do (KR)

(72) Inventor: Chul-Hyun Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/454,710

(22) Filed: Aug. 7, 2014

(65) Prior Publication Data

US 2015/0047024 A1    Feb. 12, 2015

(30) Foreign Application Priority Data

Aug. 8, 2013   (KR) .......................... 10-2013-0094430

(51) Int. Cl.
| | | |
|---|---|---|
| *H04L 29/06* | (2006.01) | |
| *G06Q 30/06* | (2012.01) | |
| *H04W 12/06* | (2009.01) | |
| *H04N 7/18* | (2006.01) | |

(52) U.S. Cl.
CPC ..... *H04L 63/0853* (2013.01); *G06Q 30/0645* (2013.01); *H04W 12/06* (2013.01); *H04N 7/183* (2013.01)

(58) Field of Classification Search
CPC ....... H04L 63/00; H04L 63/08; H04L 63/083; H04L 63/0838; H04L 63/0846; H04L 63/0853; H04L 63/10; H04L 63/107; H04L 63/108; H04L 63/18; H04W 12/00; H04W 12/06; H04W 12/08; G06Q 30/00; G06Q 30/06; G06Q 30/0601; G06Q 30/0645; H04N 7/00; H04N 7/18; H04N 7/181; H04N 7/185; H04N 1/00; H04N 1/00127; H04N 1/00204; H04N 1/00244
See application file for complete search history.

(56) References Cited

U.S. PATENT DOCUMENTS

| | | | |
|---|---|---|---|
| 6,741,250 B1 | 5/2004 | Furlan et al. | |
| 7,460,148 B1* | 12/2008 | Clark ..................... | H04N 7/183 340/539.13 |
| 7,590,261 B1 | 9/2009 | Mariano et al. | |
| 2003/0053659 A1 | 3/2003 | Pavlidis et al. | |
| 2004/0139470 A1 | 7/2004 | Treharne | |
| 2006/0125919 A1 | 6/2006 | Camilleri et al. | |
| 2006/0152592 A1 | 7/2006 | Chishima et al. | |
| 2006/0197839 A1 | 9/2006 | Senior et al. | |

(Continued)

FOREIGN PATENT DOCUMENTS

| | | |
|---|---|---|
| JP | 2002-183620 A | 6/2002 |
| JP | 2011-232877 A | 11/2011 |

(Continued)

*Primary Examiner* — Jung Kim
*Assistant Examiner* — Adrian Stoica
(74) *Attorney, Agent, or Firm* — IP Legal Services, LLC (57) ABSTRACT

The disclosure is related to a surveillance camera renting service. A service server may provide the surveillance camera renting service through receiving an image having an authentication pattern, captured by and transmitted from a surveillance camera and transmitting a video stream, produced by and transmitted from the surveillance camera, to user equipment authenticated based on the authentication pattern included in the received image.

17 Claims, 6 Drawing Sheets

(56) References Cited

U.S. PATENT DOCUMENTS

| | | |
|---|---|---|
| 2006/0291695 A1 | 12/2006 | Lipton et al. |
| 2008/0062255 A1 | 3/2008 | Gal |
| 2008/0129844 A1 | 6/2008 | Cusack et al. |
| 2008/0291278 A1 | 11/2008 | Zhang et al. |
| 2009/0219393 A1 | 9/2009 | Vian et al. |
| 2009/0293110 A1* | 11/2009 | Koga ................. G06F 21/36 726/6 |
| 2010/0225471 A1* | 9/2010 | Kawamoto ......... G06F 21/31 340/539.13 |
| 2010/0327057 A1* | 12/2010 | Medina ............ A61B 5/14551 235/382.5 |
| 2011/0119716 A1* | 5/2011 | Coleman, Sr. ........ H04N 7/181 725/62 |
| 2011/0193965 A1* | 8/2011 | Kim ................... G08B 17/125 348/159 |
| 2012/0002047 A1 | 1/2012 | An et al. |
| 2012/0046044 A1 | 2/2012 | Jamtgaard et al. |
| 2012/0154522 A1 | 6/2012 | Yoo et al. |
| 2012/0191407 A1 | 7/2012 | Kim et al. |
| 2012/0206275 A1 | 8/2012 | Mauderer |
| 2012/0330453 A1 | 12/2012 | Samak Sangari et al. |
| 2013/0116859 A1 | 5/2013 | Ihlenburg et al. |
| 2014/0197232 A1* | 7/2014 | Birkler ................ G06F 21/313 235/375 |
| 2014/0279707 A1 | 9/2014 | Joshua et al. |

FOREIGN PATENT DOCUMENTS

| | | |
|---|---|---|
| KR | 10-2010-0119920 A | 11/2010 |
| KR | 10-2010-0132693 A | 12/2010 |
| KR | 10-1026631 B1 | 4/2011 |
| KR | 10-2011-0060342 A | 6/2011 |
| KR | 10-1038370 B1 | 6/2011 |
| KR | 10-2012-0035353 A | 4/2012 |
| KR | 10-1142933 B1 | 5/2012 |
| KR | 10-2012-0085078 A | 7/2012 |
| KR | 10-2012-0090117 A | 8/2012 |
| KR | 10-2013-0015626 A | 2/2013 |
| KR | 10-1262355 B1 | 5/2013 |
| KR | 10-2013-0072790 A | 7/2013 |

* cited by examiner

SURVEILLANCE CAMERA RENTING SERVICE

CROSS REFERENCE TO PRIOR APPLICATIONS

The present application claims priority under 35 U.S.C. §119 to Korean Patent Application No. 10-2013-0094430 (filed on Aug. 8, 2013), which is hereby incorporated by reference in its entirety.

BACKGROUND

The present disclosure relates to providing a service through a communication network and, more particularly, to enabling an authenticated person to use a surveillance camera.

Many surveillance cameras have been installed at public places for various reasons, such as a security purpose. However, such surveillance cameras are not available to individual who wants to monitor a target area for a comparatively short time period. For example, a person might want to go a restroom while having a coffee and working with a laptop computer in a coffee shop. The person might leave the laptop computer on a table and go to the restroom but it might be very insecure. The person might go to the restroom with the laptop computer and come back to the table but it is very inconvenient. In this case, such a person might want to leave the laptop computer on the table and to monitor his table with the laptop computer at a remote location (e.g., restroom) for a short period time by using at least one of surveillance cameras installed in the coffee shop.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a designated person may be enabled to use at least one of surveillance cameras in a public place with a certain time period.

In accordance with another aspect of the present embodiment, a surveillance camera may be temporally rented to authenticated person based on a predetermined image pattern.

In accordance with still another aspect of the present embodiment, a service requester may be authenticated based on a predetermined image pattern issued by a service server and may be enabled to use a predetermined surveillance camera for a certain time period based on the authentication result.

In accordance with yet another aspect of the present embodiment, a surveillance camera may be rented based on an image pattern, generated by a service server and displayed on user equipment.

In accordance with at least one embodiment, a method may be provided for providing a surveillance camera renting service by a service server. The method may include receiving an image having an authentication pattern, captured by and transmitted from a surveillance camera and transmitting a video stream, produced by and transmitted from the surveillance camera, to user equipment authenticated based on the authentication pattern included in the received image. The authentication pattern may include at least one of a figure, a number, a character, a symbol, a color pattern, a black and white pattern, a code pattern, and combination thereof. The authentication pattern in the received image may be an authentication pattern displayed on a display device of the user equipment. The authentication pattern displayed on the display device of the user equipment may be an authentication pattern issued by the service server to the user equipment in response to a service request message transmitted from the user equipment.

The transmitting a video stream may include performing an authentication procedure based on the authentication pattern included in the received image and transmitting the video stream of the surveillance camera to the user equipment when the user equipment is authenticated based on a result of the authentication procedure.

The performing an authentication procedure may include obtaining an issued authentication pattern associated with the user equipment, which is issued by the service server to the user equipment in response to a service request message transmitted from the user equipment, comparing the issued authentication pattern with the authentication pattern included in the received image, and determining whether the user equipment is authenticated based on the comparison result.

The performing an authentication procedure may include transmitting the video stream of the surveillance camera when the issued authentication pattern is matched with the authentication pattern included in the received image.

The transmitting a video stream may include enabling the user equipment directly to control the surveillance camera for a given time period.

The transmitting a video stream may include receiving a video stream of the surveillance camera and delivering the received video stream to the user equipment for a given time period.

The method, prior to the receiving, may further include issuing an authentication pattern to the user equipment in response to a service request message transmitted from the user equipment.

In accordance with another embodiment, a method may be provided for using a surveillance camera by user equipment based on an authentication pattern. The method may include transmitting a service request message to a service server for monitoring a target area using at least one surveillance camera installed around the target area, receiving an authentication pattern from the service server in response to the service request message, providing the received authentication pattern to a target surveillance camera, and receiving a video stream of capturing a target area to monitor by the target surveillance camera at least for a given time period.

The transmitting a service request message may include receiving an input from a service requester for using the at least one of surveillance camera to monitor a target area, obtaining, based on the input from the service requester, information on at least one of identification of the user equipment, identification of the service requester, identification of the at least one surveillance cameras to use, a location of the user equipment, a target area to monitor, and a requested time period for monitoring, generating the service request message to include the obtained information, and transmitting the generated service request message to the service server.

The receiving an authentication pattern may include receiving an unavailability message from the service server when a corresponding service is not available at the target area. Otherwise, the authentication pattern may be received from the service server.

The providing the received authentication pattern may include displaying the received authentication pattern on a display device of the user equipment.

The receiving a video stream may include receiving the video stream of the target surveillance camera when the user equipment is authenticated by the service server based on the provided authentication pattern and the received authentication pattern.

The receiving a video stream may include receiving the video stream of the target surveillance camera when the provided authentication pattern is matched with the received authentication pattern. The receiving a video stream may include receiving the video stream, captured and produced by the target surveillance camera, from the service server. The receiving a video stream may include receiving, directly from the target surveillance camera, the video stream produced by and transmitted by the surveillance camera. The receiving a video stream may include controlling the surveillance camera to capture a target area to monitor for the given time period.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1A:
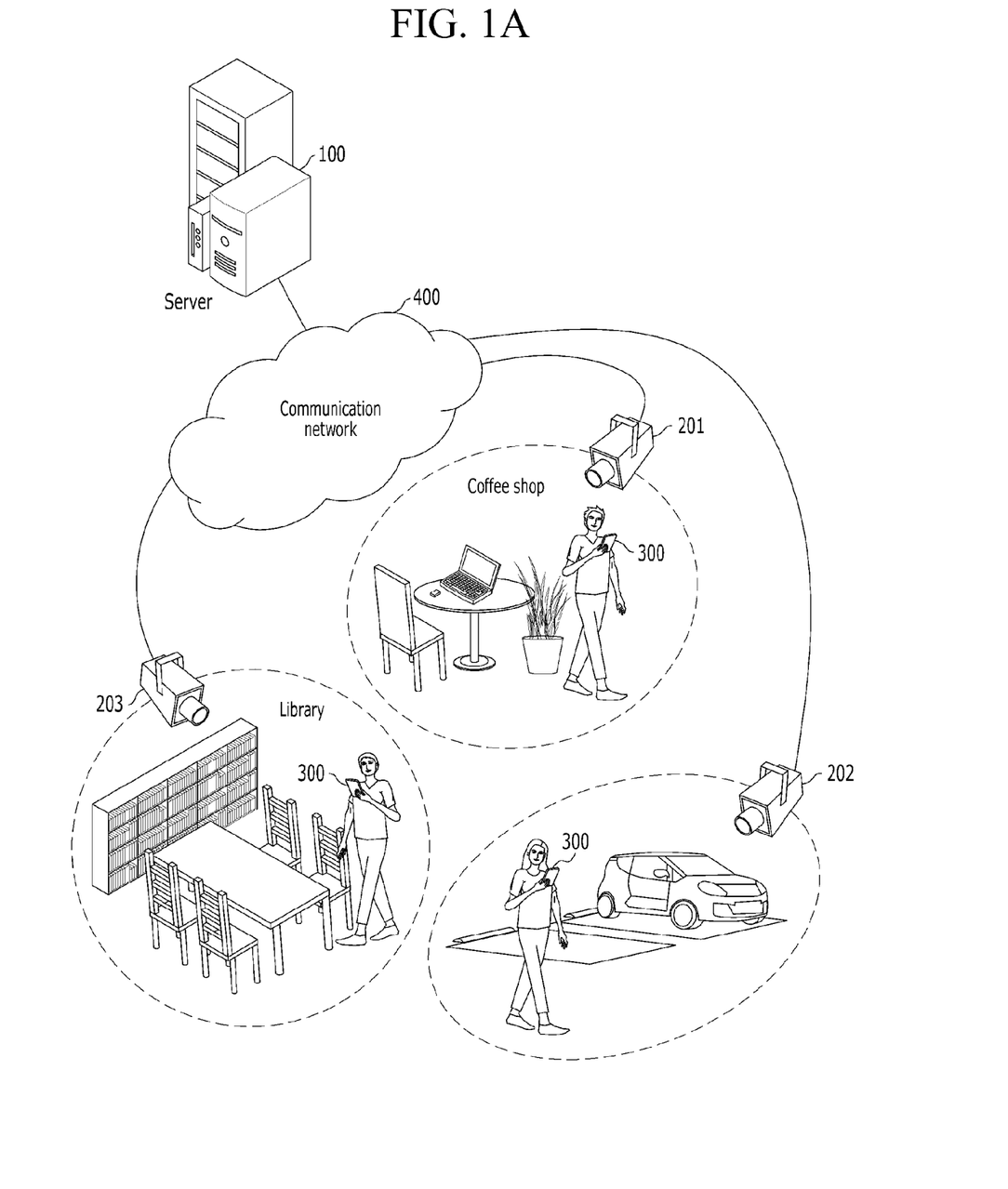
FIG. 1A and FIG. 1B illustrate a surveillance camera renting service in accordance with at least one embodiment.
Figure 1B:
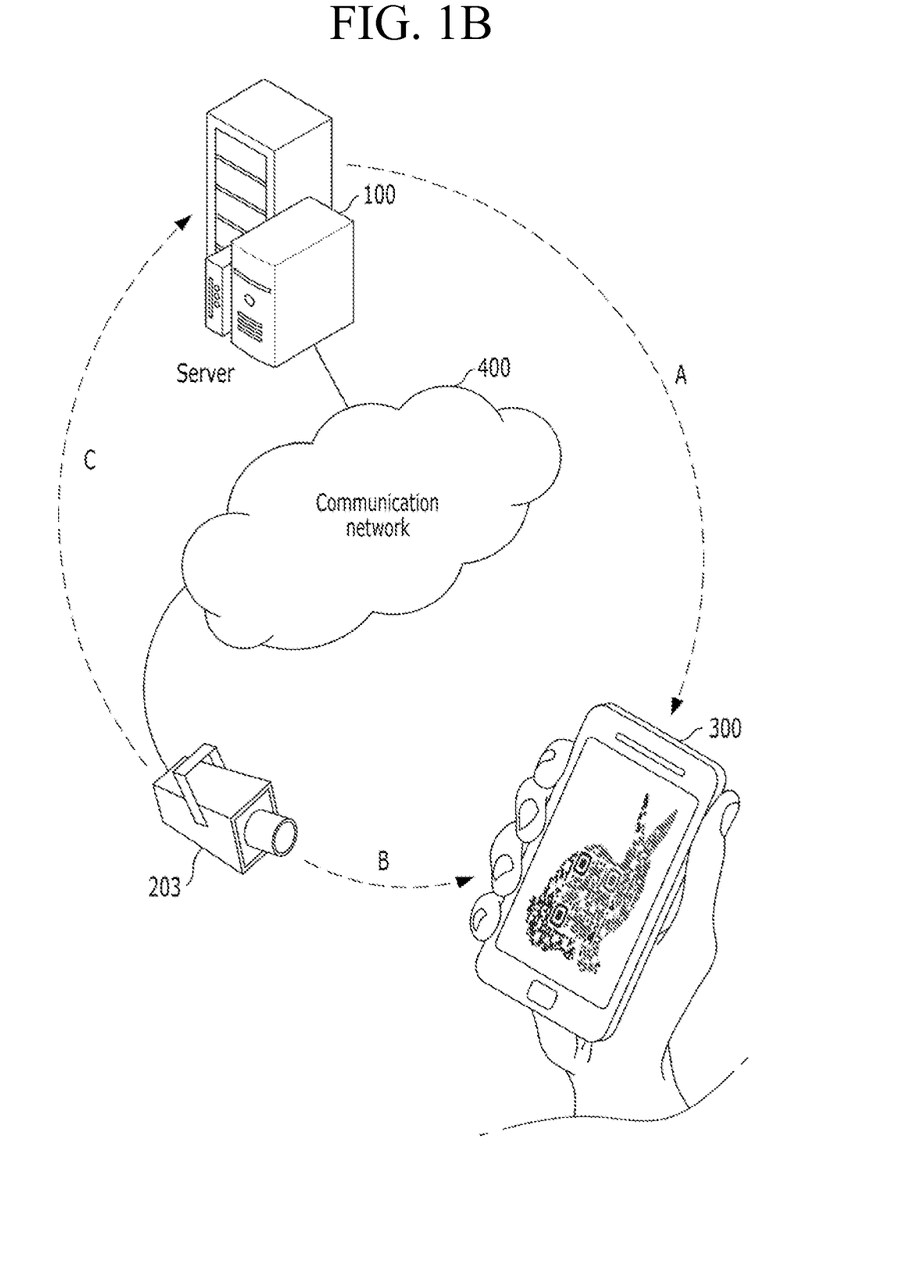

In accordance with at least one embodiment, a surveillance camera renting service may be provided through a simple method. The surveillance camera renting service may enable an authenticated person to use at least one of surveillance cameras based on an authentication pattern issued by a service server and transmitted to user equipment of a service requester. For example, upon the receipt of a service request from a service requester, a service serve may generate a unique authentication pattern in association with the service requester and transmit the generated authentication pattern to user equipment of the service requester. The service server may authenticate a service requester as a registered member based on an issued authentication pattern and an obtained authentication pattern from a surveillance camera and enable the service requester to use at least one surveillance camera for a certain time period based on the authentication result. Hereinafter, such a surveillance camera renting service will be described with reference to FIG. 1.

FIG. 1A and FIG. 1B illustrate a surveillance camera renting service in accordance with at least one embodiment.

Referring to FIG. 1A and FIG. 1B, a surveillance camera renting service may be provided through service server 100 coupled to user equipment 300 and a plurality of surveillance cameras 201 to 203 through communication network 400 in accordance with at least one embodiment. Such a surveillance camera renting service may enable a service requester to use a predetermined surveillance camera for a certain time period based on a unique authentication pattern issued by service server 100 and displayed on user equipment 300.

For example, such a surveillance camera renting service may be requested by a person who wants to monitor his/her belongings in real time from a remote location. That is, a person might want to temporally leave a table with his laptop computer and books left on the table. It might happen often in a coffee shop or a library. Furthermore, a person might want to monitor a car parked at a public parking lot. Such a person might want to monitor his/her belongings in real time through one of surveillance cameras installed in the coffee shop, the public parking lot, or the library, which is near to his belongings. In this case, the person may request such a surveillance camera renting service to service server 100. In response to such request, service server 100 may enable the person to use at least one surveillance camera for a certain time period based on a unique authentication pattern generated by service server 100, transmitted to user equipment 300, displayed on user equipment 300, and obtained from user equipment 300 through an associated surveillance camera in accordance with at least one embodiment.

As described, service server 100 may be coupled to a plurality of surveillance cameras 201 to 203 and user equipment 300 through communication network 400. Service server 100 may a computing system of a service provider for providing the surveillance camera renting service. For example, service server 100 may provide user equipment 300 with software programs and associated data for the surveillance camera renting service. Service server 100 may manage and control a plurality of surveillance cameras installed in various types of locations. Such surveillance cameras may be grouped by a corresponding location and managed and controlled by a corresponding local server. Service server 100 may generate an authentication pattern and transmit the generated authentication pattern to user equipment 300 in response to a service request from user equipment 300. Service server 100 may authenticate a user, as a registered service member and designate at least one surveillance camera to be rented based on the issued authentication pattern and an authentication pattern displayed on and obtained from user equipment 300. Service server 100 may transmit images captured in real-time by the designated surveillance cameras to authenticated user equipment 300 for a predetermined time period.

Such authentication operation of service server 100 is illustrated in FIG. 1B. Referring to FIG. 1B, service server 100 may generate a unique graphical authentication pattern in response to a service request from user equipment 300 and transmit the generated graphical authentication pattern to user equipment 300 (e.g., operation A). User equipment 300 may display the received graphical authentication pattern and show it to surveillance camera 203 (e.g., operation B). Surveillance camera 203 may capture an image of the graphical authentication pattern displayed on user equipment 300 and transmit the captured image to service server 100 (e.g., operation C). Service server 100 may perform the authentication procedure based on the received image capturing the graphic authentication pattern and an initial graphical authentication pattern issued to user equipment 300.

Such service server 100 may be located at a control center (e.g., a main office building) of a service provider, but the present invention is not limited thereto. Service server 100 may be implemented as a clouding computer and distributed through a wide area. For example, a plurality of servers may be installed at respective service areas each including multiple surveillance cameras. Such service areas may include a coffee shop, a library, a parking building, and an office building.

User equipment 300 may be a user device for enabling a user to have a surveillance camera renting service in accordance with at least one embodiment. User equipment 300 may be any electronic device capable of communication, data processing, data displaying, and data storing. For example, user equipment 300 may include a mobile phone, a smart phone, a pad-like device, a portable computer, a personal computer, a laptop computer, and likes.

User equipment 300 may enable a user to request the surveillance camera renting service to service server 100 in order to rent at least one surveillance camera. Through the surveillance camera renting service, user equipment 300 may enable a user to monitor a target area (e.g., target objects) for a certain period of time. Particularly, user equipment 300 may receive software program (e.g., App) and necessary data from service server 100 for the surveillance camera renting service. User equipment 300 may receive a predetermined authentication pattern from service server 100. User equipment 300 may output the received predetermined authentication pattern for the authentication purpose or for designating a surveillance camera to rent. In addition, user equipment 300 may receive a real-time video stream, captured by the designated surveillance camera, from service server 100 and display the received image stream on a display device thereof.

Surveillance cameras 201 to 203 may be cameras installed at a predetermined location for monitoring activities in a target area. For example, surveillance cameras 201 to 203 may be referred to as monitoring cameras. Surveillance cameras 201 to 203 may be also referred to as closed circuit television (CCTV). However, the present invention is not limited thereto. Surveillance cameras 201 to 203 may be any cameras capable of capturing images of activities in a designated location and transmit the captured images to service server 100.

In accordance with at least one embodiment, surveillance cameras 201 to 203 may be controlled and managed by service server 100. Alternatively, surveillance cameras 201 to 203 may be temporally controlled and managed by authenticated user equipment for a certain time period. Surveillance cameras 201 to 203 may capture a predetermined authorization pattern displayed on user equipment 300 and transmit the captured image to service server 300.

Communication network 400 may couple service server 100, a plurality of surveillance cameras 201 to 203, and user equipment 300. For example, communication network 400 may be a wired communication network or a wireless communication network. Particularly, communication network 400 may include third generation network (3G network), a long term evolution network (LTE), and a WiFi network.

As described, service server 100 may perform operations for providing a surveillance camera renting service to user equipment 300. For example, service server 100 may manage and control a plurality of surveillance cameras installed in various types of locations. Service server 100 may generate an authentication pattern and transmit the generated authentication pattern to user equipment 300 in response to a service request from user equipment 300. Service server 100 may perform an authentication procedure. Service server 100 may deliver images captured in real-time by a surveillance camera to authenticated user equipment 300 for a predetermined time period. Hereinafter, such service server 100 will be described with reference to FIG. 2.

Figure 2:
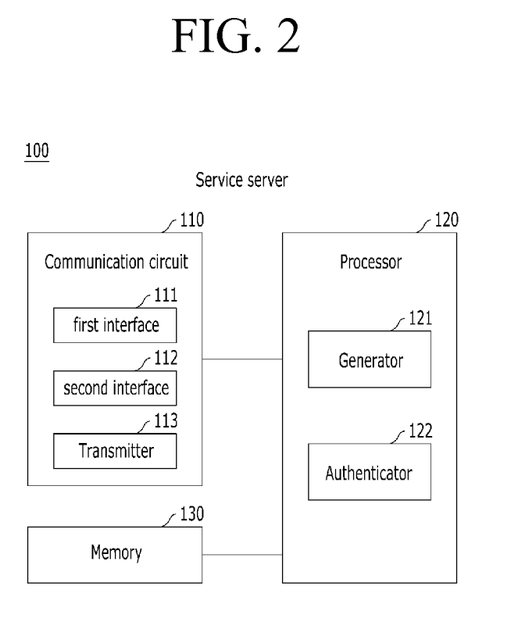
FIG. 2 illustrates a service server for a surveillance camera renting service in accordance with at least one embodiment.

FIG. 2 illustrates a service server for a surveillance camera renting service in accordance with at least one embodiment.

Referring to FIG. 2, service server 100 may include communication circuit 110, processor 120, and memory 130. Communication circuit 110 may perform operation for communicating with other entities coupled through communication network 400. For example, communication circuit 110 may transmit data to or receive data from surveillance cameras 201 to 203 and user equipment 300 through communication network 400.

In accordance with at least one embodiment, communication circuit 110 may include first interface 111 for communication with user equipment 300, second interface 112 for communication with surveillance cameras 201 to 203, and transmitter 113 for deliver a video stream produced by a surveillance camera to user equipment 300.

First interface 111 may establish a communication link to user equipment 300 through communication network 400. Through such a communication link, first interface 111 may transmit data to and receive data from user equipment 300. For example, first interface 111 may receive a service request message from user equipment 300 and a response message to user equipment 300. First interface 111 may transmit an initial graphical authentication pattern to user equipment 300 upon the receipt of the service request. First interface 111 may transmit various messages, such as an authentication success message, an authentication failure message, a service unavailability message, a service availability message, and so forth.

Second interface 112 may establish a communication link to a plurality of surveillance cameras 201 to 203. Through such a communication link, second interface 112 may transmit data to and receive data from surveillance cameras 201 to 203. For example, second interface may transmit messages to control surveillance cameras 201 to 203. Second interface may receive a video stream produced and transmitted from at least one of surveillance cameras 201 to 203. Second interface may receive a captured image of a graphical authentication pattern displayed on user equipment 300.

Through second interface 112, a designated surveillance camera may be controlled to capture real-time images of a target area or target objects. For example, service server 100 may control surveillance camera 201 to capture images of the target area or the predetermined objects of the service requester in real time through second interface 112.

Transmitter 113 may transmit images captured from a designated surveillance camera to user equipment 300 in real time through streaming. That is, transmitter 113 may deliver a video stream produced by a designated surveillance camera to user equipment 300.

Processor 120 may perform operations for controlling constituent elements of service server 100 and to provide a surveillance camera renting service in accordance with at least one embodiment. For example, processor 120 may include generator 121 and authenticator 122.

Generator 121 may generate a unique graphical authentication pattern to each service requester. The graphical authentication pattern may include figures, numbers, characters, symbols, color pattern, black and white patterns, code patterns, and combination thereof. For example, the graphical authentication pattern may include a code pattern representing desired information, such as information on identification of user equipment 300, identification of the service requester, identification of a surveillance camera to rent, a location of user equipment 300, a target area to monitor, a requested time period for monitoring, and so forth. The code pattern may include a bar code, a quick response (QR) code, and so forth. Generator 121 may generate a unique graphical authorization pattern in response to the service request message from user equipment 300. After generation, service server 100 may transmit the generated graphic authorization pattern to user equipment 300 through first interface 111.

The authentication pattern was described as a graphic pattern, but the present invention is not limited thereto. The authentication pattern may be a sound pattern and a vibration pattern. Such authentication pattern may be used when surveillance cameras are capable of detecting such sound and vibration. In this case, service server 100 may generate data that controls user equipment 300 to plays back a unique pattern of sound or vibration and transmit such generated data to user equipment 300 as the authentication pattern.

Authenticator 122 may determine whether a service requester is an authenticated person (e.g., registered service member) for the surveillance camera renting service based on a graphical authentication pattern. For example, authenticator 122 may perform an authentication procedure based on at least one of a graphical authentication pattern received from a surveillance camera, supplementary information (e.g., information on user equipment of a service requester) from the surveillance camera, and an initial graphical authentication pattern obtained based on the information on user equipment of the service requester.

That is, service server 100 may receive the captured graphical authentication pattern through second interface 112 and perform the authentication procedure based on the received graphical authentication pattern through authenticator 122. Authenticator 122 may compare the initial graphic authentication pattern issued to user equipment 300 and the received graphic authentication pattern from the surveillance camera with identification information of user equipment 300. In addition, authenticator 122 may extract a code pattern, such as a bar code and a QR code, from the captured graphic authentication pattern and obtain information necessary for the authentication procedure. Alternatively, authenticator 122 may obtain supplementary information for the authentication procedure from the service request message or information received with the captured graphical authentication pattern from the surveillance camera, but the present invention is not limited thereto. For example, authenticator 122 may obtain such supplementary information by analyzing an image captured with the graphical authentication pattern. That is, such an image may include information on a time of capturing the image and a location of capturing the image. Furthermore, the image may include images of a service requestor, user equipment, and a target area to monitor. Authenticator 122 may analyze such images in the captured image and determine the supplementary information for the authentication procedure.

When the received graphical authentication pattern is not matched with the initial graphical authentication pattern in association with user equipment 300, authenticator 122 determines that the service requestor is not an authorized person for the service, generates an authentication failure message, and transmits the authentication failure message to user equipment 300. When the received graphical authentication pattern is matched with the initial graphical authentication pattern issued in association with user equipment 300, authenticator 122 determines that the service requester is an authorized person to use the service, generates an authentication success message, and transmits the authentication success message to user equipment 300.

Memory 130 may store various types of data for operating constituent elements of service server 100 and for performing a surveillance camera renting service. For example, memory 130 may store an application produced and designated for a surveillance camera renting service in order to be provided to user equipment 300. Furthermore, memory 130 may store information included in the received service request message. As described, the received service request message may include information on identification of user equipment 300, identification of the service requester, identification of a surveillance camera to rent, a location of user equipment 300, a target area to monitor, a requested time period for monitoring, and so forth.

Memory 130 may store information on an initial graphical authentication pattern in association with a service requester or user equipment. That is, when a graphic authentication pattern is issued to a service requestor or user equipment, information on such a graphic authentication pattern may be stored in connection with information on an associated service requester or associated user equipment. Such information may be stored in memory 130.

As described, user equipment 300 may enable a user to monitor a target area for a predetermined time period by using one of surveillance cameras in accordance with at least one embodiment. Hereinafter, such user equipment 300 will be described in more detail with reference to FIG. 3.

Figure 3:
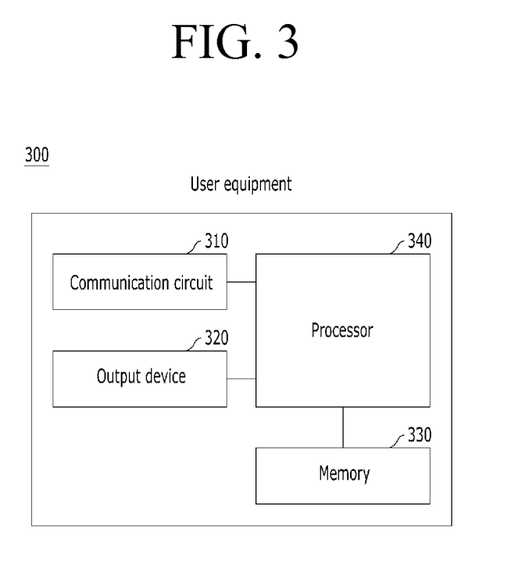
FIG. 3 illustrates user equipment for a surveillance camera renting service in accordance with at least one embodiment.

FIG. 3 illustrates user equipment for a surveillance camera renting service in accordance with at least one embodiment.

Referring to FIG. 3, through the surveillance camera renting service, user equipment 300 may enable a user to monitor a target area (e.g., target objects) for a certain period of time. Particularly, user equipment 300 may receive software program (e.g., App) and necessary data from service server 100 for the surveillance camera renting service. User equipment 300 may receive a predetermined authentication pattern from service server 100. User equipment 300 may output the received predetermined authentication pattern for the authentication purpose or for designating a surveillance camera to rent. In addition, user equipment 300 may receive a real-time video stream, captured by the designated surveillance camera, from service server 100 and display the received image stream on a display device thereof.

Such user equipment 300 may include communication circuit 310, output circuit 320, memory 330, and processor 340.

Communication circuit 310 may perform operation for communicating with other entities coupled through communication network 400. For example, communication circuit 310 may transmit data to or receive data from surveillance cameras 210 to 203 and service server 100 through communication network 400.

Communication circuit 310 may transmit a service request message for the surveillance camera renting service to service server 100. Communication circuit 310 may receive a graphical authentication pattern from service server 100 in response to the service request message. Furthermore, communication circuit 310 may receive a service unavailability message and a service availability message from service server 100. Communication circuit 310 may receive a video stream, produced and transmitted from a designated surveillance camera, form at least one of service server 100 and the designated surveillance camera.

Communication circuit 310 may communicate with other entities using various types of short-distance communication schemes or near field communication, such as Bluetooth, WiFi, radio-frequency identification (RFID), wireless broadband (WiBro), and so forth. Accordingly, communication circuit 310 may further include necessary circuits for short-distance communication or near field communication. For example, user equipment 300 may collect information on devices located in a predetermined distance through Bluetooth, WiFi, RFID, or WiBro communication scheme. That is, user equipment 300 may communicate with a surveillance camera through Bluetooth, WiFi, RFID, or WiBro. Through such communication, user equipment 300 may detect surveillance cameras located near to user equipment 300. Such collected information may be included in a service request message and transmitted to service server 100.

Furthermore, communication circuit 310 may receive global positioning system (GPS) signals and generate GPS information thereof. Such GPS information may be also included in the service request message and transmitted to service server 100. The GPS information and the information on the detected devices (e.g., surveillance camera) may be used to determine a location of user equipment, a location of available surveillance camera, and service availability.

Display 320 may be a device for displaying various types of information, such as text, character, and images. Display 320 may display a graphical authentication pattern or a video stream received in real time from service server 100 through communication circuit 310. In addition, display 320 may display a graphic user interface, messages, and images, produced by user equipment 300 or delivered from other entities coupled through communication network 400.

Processor 340 may perform operations for controlling constituent elements of user equipment 300 and to provide a surveillance camera renting service in accordance with at least one embodiment. For example, processor 340 may perform operation for a surveillance camera renting service for using at least one of surveillance cameras located in a target area to monitor. That is, processor 340 may generate a service request message to include information on identification of user equipment 300, identification of the service requester, identification of a surveillance camera to rent, a location of user equipment 300, a target area to monitor, a requested time period for monitoring, and so forth. Processor 340 may transmit the service request message through communication circuit 310.

Processor 340 may perform operation for receiving a video stream of a target area to monitor from one of service server 100 and a designated surveillance camera through communication circuit 310 and for displaying the received video stream through display 320.

Memory 330 may store various types of data for operating constituent elements of user equipment 300 and for performing a surveillance camera renting service. For example, memory 330 may store an application designated for a surveillance camera renting service and downloaded from service server 100. Furthermore, memory 330 may store information to be included in a service request message. Memory 330 may also store information on a graphical authentication pattern from service server 100.

Figure 4:
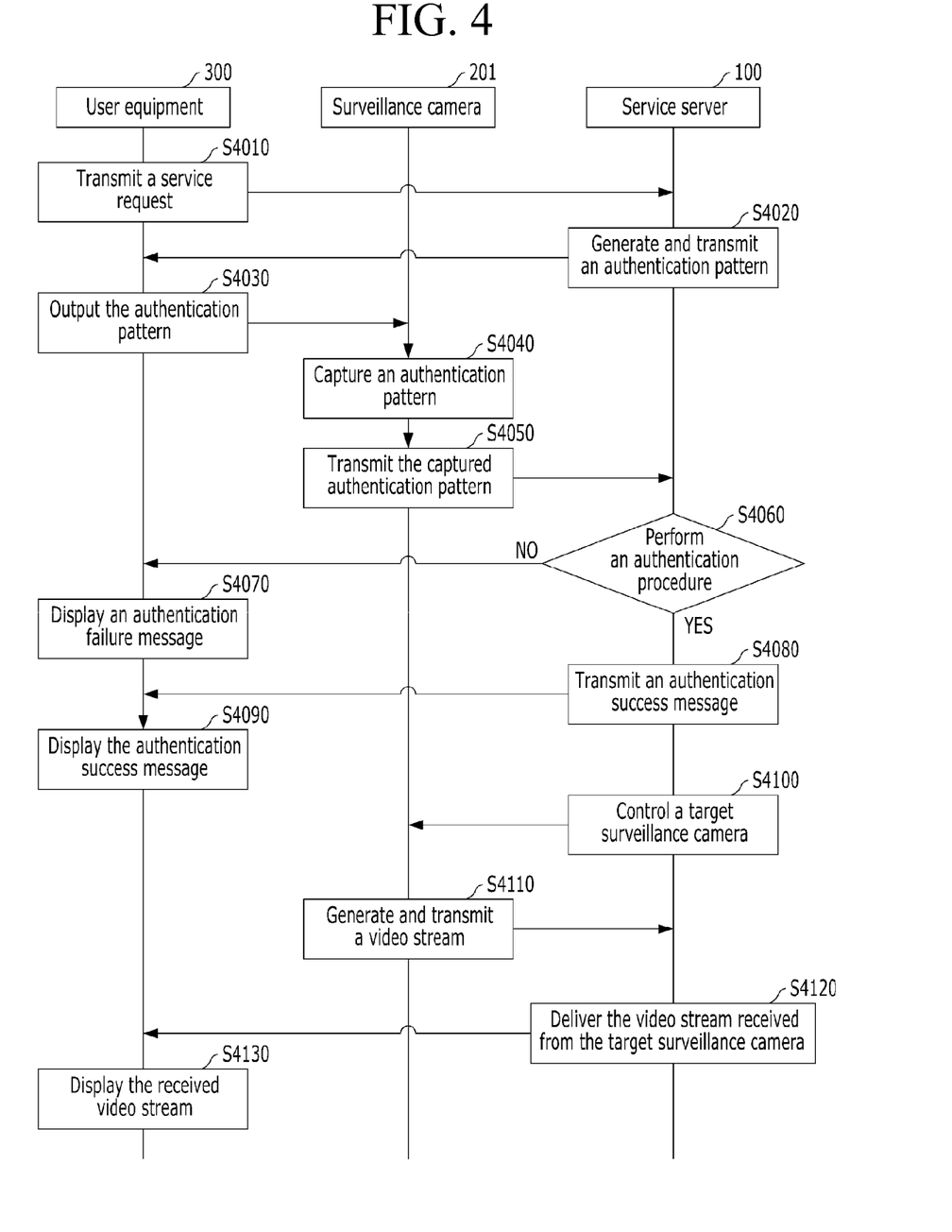
FIG. 4 illustrates overall operation for a surveillance camera renting service in accordance with at least one embodiment.

Hereinafter, overall operation for the surveillance camera renting service will be described in reference to FIG. 4. FIG. 4 illustrates a method for a surveillance camera renting service in accordance with at least one embodiment.

Referring to FIG. 4, a service request for the surveillance camera renting service may be transmitted to service server 100 at step S4010. For example, user equipment 300 requests the surveillance camera renting service to service server 100 in order to rent at least one of cameras, for example, a surveillance camera that can capture images of target objects or target areas to monitor). As such a service request, a service request message may be generated to include information on identification of user equipment 300, identification of the service requester, identification of a surveillance camera to rent, a location of user equipment 300, a target area to monitor, a requested time period for monitoring, and so forth.

At step S4020, a unique authentication pattern may be generated and transmitted in response to the service request. For example, service server 100 may generate a unique graphical authorization pattern in response to the request. The unique graphical authentication pattern may include information on an authentication key issued to an associated service requester (e.g., user equipment), identification of the service requester (e.g., user equipment 300), a granted target area to monitor, identification of a granted surveillance camera, a granted time period for renting the granted surveillance camera, a location of a grated surveillance camera, and so forth. After generation, service server 100 may transmit the generated graphic authorization pattern to user equipment 300.

The authentication pattern was described as a graphic pattern, but the present invention is not limited thereto. The authentication pattern may be a sound pattern and a vibration pattern. Such authentication pattern may be used when surveillance cameras are capable of detecting such sound and vibration. In this case, service server 100 may generate data that controls user equipment 300 to plays back a unique pattern of sound or vibration and transmit such generated data to user equipment 300 as the authentication pattern.

At step S4030, the authentication pattern may be outputted. For example, user equipment 300 may receive the graphical authentication pattern from service server 100 and display the graphical authentication pattern on a display device thereof. In addition, user equipment 300 may extract information included in the graphical authentication pattern and provide the extracted information to the service requester. Such extracted information may include information on an authentication key issued to an associated service requester (e.g., user equipment), identification of the service requester (e.g., user equipment 300), a granted target area to monitor, identification of a granted surveillance camera, a granted time period for renting the granted surveillance camera, a location of a grated surveillance camera, and so forth.

At step S4040, the authentication pattern may be captured. For example, the graphical authentication pattern displayed on user equipment 300 may be exposed to a surveillance camera, (e.g., surveillance camera 201) that the service requester wants to use. That is, the service requester puts user equipment 300 displaying the received authentication pattern close to a camera lens of the surveillance camera after receiving the graphical authentication pattern. Surveillance camera 201 captures the graphical authentication pattern displayed on user equipment 300. The captured graphical authentication pattern may include information substantially identical to an initial graphic authentication pattern, such as information on an authentication key issued to an associated service requester (e.g., user equipment), identification of the service requester (e.g., user equipment 300), a granted target area to monitor, identification of a granted surveillance camera, a granted time period for renting the granted surveillance camera, a location of a grated surveillance camera, and so forth.

In addition, surveillance camera 201 may capture surroundings of the user equipment displaying the graphical authentication pattern. Such images of surroundings may be transmitted with the captured graphical authentication pattern to service server 100. Service server 100 may analyze such images of surroundings to obtain supplementary information for performing an authentication procedure.

At step S4050, the captured authentication pattern may be transmitted to service server 100. For example, surveillance camera 201 may transmit the captured graphical authentication pattern to service server 100. In addition to the captured authentication pattern, surveillance camera 201 may transmit information on a time of capturing the graphical authentication pattern and identification of surveillance camera 201 to service server 100.

At step S4060, an authentication procedure may be performed based on at least one of the received graphical authentication pattern, the supplementary information from surveillance camera, and stored information associated with a service requester. For example, service server 100 may receive the captured graphical authentication pattern and perform the authentication procedure based on the received graphical authentication pattern. That is, service server 100 may determine whether a service requester (e.g., user equipment 300) is an authenticated person to rent surveillance camera 201 or not based on the received graphical authentication pattern and an initial graphic authentication pattern issued in association with user equipment 300. For example, service server 100 may compare the initiation graphic authentication pattern issued to user equipment 300 and the received graphic authentication pattern from the surveillance camera with identification information of user equipment 300.

When the authentication procedure is failed (No—S4060), an authentication failure message may be transmitted and displayed at step S4070. For example, when the received graphical authentication pattern is not matched with the initial graphical authentication pattern in association with user equipment 300, service server 100 determines that the service requestor is not an authorized person for the service, generates an authentication failure message, and transmits the authentication failure message to user equipment 300. User equipment 300 receives the authentication failure message and displays the received authentication failure message through a display device.

When the authentication procedure is success (Yes—S4060), an authentication success message may be transmitted at step S4080. For example, when the received graphical authentication pattern is matched with the initial graphical authentication pattern issued in association with user equipment 300, service server 100 determines that the service requester is an authorized person to use the service, generates an authentication success message, and transmits the authentication success message to user equipment 300.

At step S4090, the authentication success message may be received and displayed. For example, user equipment 300 receives the authentication success message from service server 100 and display the received authentication success message through a display device. In response to the authentication success message, user equipment 300 may produce a graphic user interface and a processing environment for receiving a video stream (e.g., images) of surveillance camera 201 from service server 100 and displaying the received video stream in order to enable the service requester to monitor a target area or a target object.

At step S4100, the designated surveillance camera may be controlled to capture real-time images of a target area or target objects. For example, service server 100 may control surveillance camera 201 to capture images of the target area or the predetermined objects of the service requester in real time. Furthermore, service server 100 may control surveillance camera 201 to transmit the captured images to service server 100, but the present invention is not limited thereto. For example, service server 100 may control surveillance camera 210 to transmit the captured image directly to user equipment 300. Such image may be transmitted in a form of video stream. In this case, service server 100 may transmit information on user equipment 300 and the service requester thereof to surveillance camera 201. Such information may include an IP address of user equipment 300 to transmit the video stream from surveillance camera 201.

At step S4110, a video stream may be generated and transmitted. For example, in response to the control of service server 100, surveillance camera 201 may capture images of a target area or a target object, generate a video stream thereof, and transmit the generated video stream to service server 100. At step S4120, the video stream of a target area or a target object may be delivered. For example, service server 100 may receive the video stream of a target area or a target object from surveillance camera 201 and transmit the received video stream to user equipment 300.

At step S4130, the video stream of the target area or the target object may be displayed. For example, user equipment 300 may receive the video stream of the target area or the target object, captured by surveillance camera 201 in real-time, from service server 100. User equipment 300 may display the received video stream in order to enable the service requester for monitoring desired objects in the target area for a predetermined time period.

User equipment 300 was described as receiving the video stream of the target area, captured by surveillance camera 200 and delivered through service server 100, but the present invention is not limited thereto. For example, user equipment 300 may be allowed to directly control surveillance camera 201. In this case, service server 100 may transmit information on surveillance camera 210 for direct control. Through such information, user equipment 300 may establish a communication link to surveillance camera for a given time and directly control surveillance camera, such as a viewing direction, a resolution, and so forth.

Hereinafter, exemplary detailed operations of user equipment for a surveillance camera renting service in accordance with at least one embodiment will be described with reference to FIG. 5. The detailed operations of user equipment 300 for renting surveillance camera 201 located in a coffee shop will be described as a representative example. However, the present invention is not limited thereto.

Figure 5:
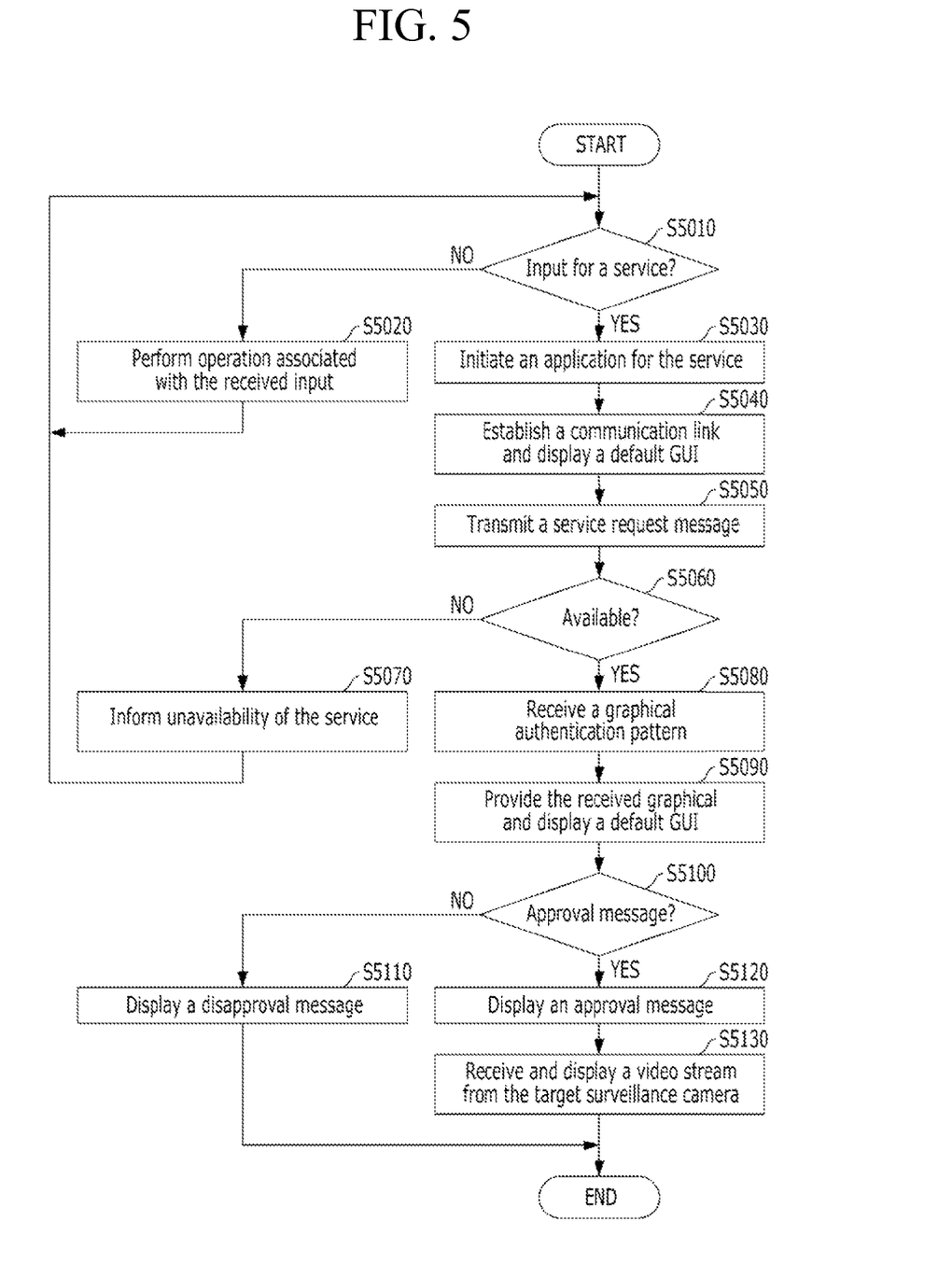
FIG. 5 illustrates operations of user equipment for a surveillance camera renting service in accordance with at least one embodiment.

FIG. 5 illustrates operations of user equipment for providing a surveillance camera renting service in accordance with at least one embodiment.

Referring to FIG. 5, upon the receipt of an input from a user, user equipment 300 may determine whether a received input is an input for initiating a surveillance camera renting service at step S5010. In order to initiate the surveillance camera renting service, a service requester may make a touch input on an icon associated with the surveillance camera renting service.

When the input is not the initiation input of the surveillance camera renting service (No—S5010), user equipment 300 may perform operation associated with the user input at step S5020. When the input is the initiation input for the surveillance camera renting service (Yes—S5010), a designated application for the surveillance camera renting service may be initiated at step S5030. For example, in response to a user input, user equipment 300 initiates the designated application for the surveillance camera renting service. Such user input may be made on the associated icon displayed on a touch screen (e.g., display device of user equipment 300). That is, the service requester may activate an icon of the designated application, displayed within a default graphic user interface (e.g., home screen).

Such application may be provided to user equipment 300 as a form of software program from service server 100. For example, such application may be downloaded from service server 100 and installed in user equipment 300 for the surveillance camera renting service.

At step S5040, upon the initiation, user equipment 300 may establish a communication link to service server 100 and display a default graphic user interface for the surveillance camera renting service. Through such a communication link, user equipment 300 may transmit information on user equipment 300 and the service requester to service server 100 for the surveillance camera renting service.

At step S5050, user equipment 300 may produce and display a main graphic user interface for the surveillance camera renting service and transmit a service request message to service server 100 upon the receipt of a user input for requesting the service. For example, when the service requester wants to use or to rent a predetermined surveillance camera for monitoring predetermined objects in a target area, the service requester may make a request by activating one of menu options displayed within the main graphic user interface. In response to such activation, user equipment 300 may generate a service request message. The request message may include information on identification of user equipment 300, identification of the service requester, identification of a surveillance camera to rent, a location of user equipment 300, a target area to monitor, a requested time period for monitoring, and so forth In addition to activate a corresponding menu, such a service request message may be also made by capturing an image of a target surveillance camera with an identification number and transmitting the captured image to service server 100. Furthermore, such a request message may be made by capturing an image of a target area to monitor and transmitting the captured image to service server 100. Such captured image may include information on a time of capturing the image and location information of the captured location.

Service server 100 may receive such a service request message from user equipment 300 and determine whether a requested service is available to user equipment 300 based on information included in the service request message. For example, service server 100 may extract information on a location of user equipment 300 or identification of a target surveillance camera from the service request message. Based on the extracted information, service server 100 may determine whether the surveillance camera renting service is available to the target area (e.g., the current location of user equipment 300) or whether the target surveillance camera is available for the surveillance camera renting service. Based on the determination, service server 100 may generate a response message and transmit the generated response message to user equipment 300 in response to the request message.

At step S5060, user equipment may receive such a response message in response to the request message and determine whether the surveillance camera renting service is available.

When the surveillance camera renting service is not available at the target area to monitor or when the target surveillance camera is not available for the surveillance camera renting service based on the determination result (No—S5060), user equipment 300 may display information to inform the service requester of surveillance camera renting service unavailability at step S5070.

When the surveillance camera renting service is available at the target area to monitor or when the target surveillance camera is available for the surveillance camera renting service based on the determination result (Yes—S5060), user equipment 300 may extract a unique graphical authentication pattern from the response message and display the information in order to inform that the surveillance camera renting service is available at step S5080.

At step S5090, user equipment 300 may provide the extracted graphical authentication pattern to a target surveillance camera to rent. For example, user equipment 300 may display the extracted graphical authentication pattern on the display device and expose it to the target surveillance camera, but the present invention is not limited thereto. Such authentication pattern may be wirelessly transmitted to the target surveillance camera through a predetermined communication scheme. The authentication pattern (e.g., a certain pattern of sound) may be played and output through a speaker, and the target surveillance camera may record the predetermined sound pattern as the authentication pattern.

The target surveillance camera may capture an image of the authentication pattern displayed on user equipment 300 and transmit the captured image to service server 100. Service server 100 may perform an authentication procedure based on the captured image. Based on the authentication procedure result, service server 100 may generate one of an approval message and a disapproval message and transmit the generated message to user equipment 300.

At step S5100, user equipment 300 may receive a message from service server 100 and determine whether the received message is an approval message and a disapproval message.

When the received message is the disapproval message (No—S5100), user equipment 300 may display the disapproval message on the display device at step S5110. When the message is the approval message (App-S5110), user equipment 300 may display the message on the display device at step S5120. Such message may include information on identification of a granted surveillance camera to use and a granted time period for receiving a video stream captured and produced by the target surveillance camera.

Then, at step S5130, user equipment 300 may receive a video stream of a target area, captured and generated by the target surveillance camera, from service server 100 and display the received video stream in order to enable the service requester to monitor the target area at a remote location.

Figure 6:
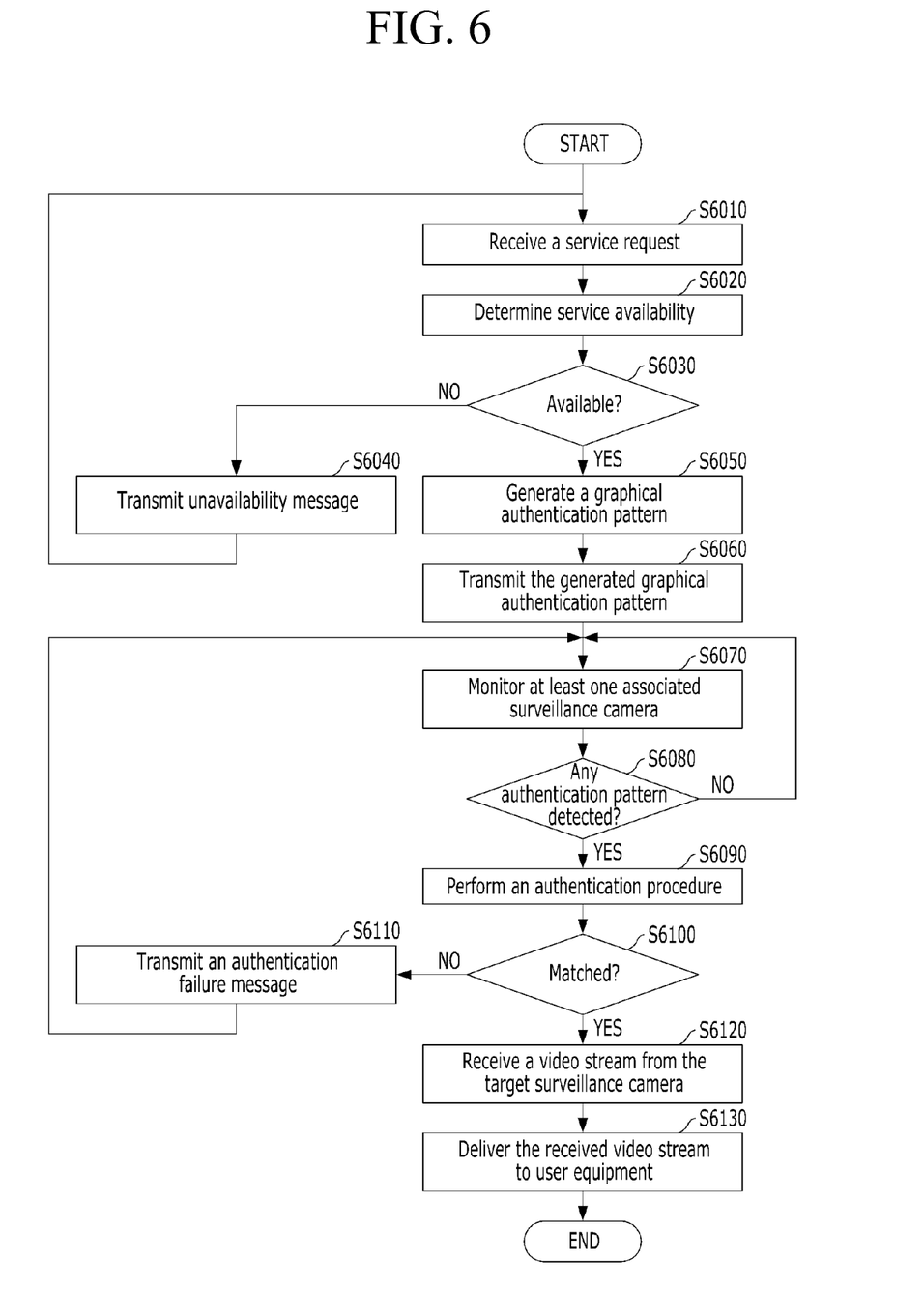
FIG. 6 illustrates operations of a service server for a surveillance camera renting service in accordance with at least one embodiment.

FIG. 6 illustrates operations of a service server for providing a surveillance camera renting service in accordance with at least one embodiment.

Referring to FIG. 6, service server 100 may receive a service request message from user equipment 300 at step S6010. Such a service request message may be generated by user equipment 300 upon the receipt of user inputs when a service requester wants to monitor a target area at a remote location. The service request message may include information on identification of user equipment 300, identification of the service requester, identification of a surveillance camera to rent, a location of user equipment 300, a target area to monitor, a requested time period for monitoring, and so forth.

At step S6020, service server 100 may determine whether a surveillance camera renting service is available in association with the requested target area, in association with the service requester (e.g., user equipment 300), or in association with the requested surveillance camera. For example, service server 100 may extract necessary information from the received service request message, such as information on identification of user equipment 300, identification of the service requester, identification of a surveillance camera to rent, a location of user equipment 300, a target area to monitor, a requested time period for monitoring. Based on the extracted information, service server 100 may determine whether the requested surveillance camera is available to rent, whether the requested surveillance camera is available for the service, or whether a surveillance camera renting service is available at one of the target area and the location of user equipment 300.

When the surveillance camera renting service is not available (No—S6030), service server 100 may generate a message for informing the unavailability of the surveillance camera renting service and transmit the generated message to user equipment 300 at step S6040. When the surveillance camera renting service is available (Yes—S6030), service server 100 may generate a unique graphical authentication pattern in association with user equipment 300 at step S6050.

At step S6060, service server 100 may transmit the generated unique graphical authentication pattern to user equipment 300. For example, a response message may be generated to include the generated unique graphical authentication pattern and information for informing the availability of the surveillance camera renting service in response to the service request message. In addition, service server 100 may encode the generated message and transmit with a corresponding decoding key.

At step S6070, service server 100 may determine whether any surveillance cameras transmit a graphical authentication pattern. For example, service server 100 may select one of the surveillance cameras, selected by the service requester for use, and monitor the selected surveillance camera to determine whether the selected surveillance camera transmits an image of any graphical authentication pattern. Alternatively, service server 100 may monitor a plurality of surveillance cameras located near to user equipment 300 to determine whether any of them captures a graphical authentication pattern. Or, service server 100 may monitor all of surveillance cameras under the control thereof to determine whether any of them captures a graphical authentication pattern.

When service server 100 detects any graphical authentication pattern (Yes—S6080), service server 100 performs an authentication procedure in associated with user equipment 300 based on the received graphical authentication pattern at step S6090. For example, service server 100 may compare the received graphical authentication pattern with an initial graphical authentication pattern issued in association with user equipment 300.

When the received graphical authentication pattern is not matched with the initial graphical authentication pattern (No—S6100), service server 100 may generate a message for informing authentication failure and transmit the generated message to user equipment 300 at step S6110. When the received graphical authentication pattern is matched with the initial graphical authentication pattern (Yes—S6100), service server 100 may receive a video stream (e.g., captured images) from the requested surveillance camera at step S6120. At step S6130, service server 100 may deliver the video stream from the requested surveillance camera to user equipment 300 for a predetermined time period.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing a surveillance camera renting service by a service server, the method comprising:
   issuing an authentication pattern to be used for authentication of user equipment when a service request message for the surveillance camera renting service is received from the user equipment, wherein the service request message includes information on a target area to be monitored;
   transmitting the issued authentication pattern to the user equipment to be authenticated, in response to the service request message;
   receiving an image having an authentication pattern, captured by and transmitted from a surveillance camera installed around the target area;
   performing an authentication procedure for the user equipment by comparing the authentication pattern included in the received image with the issued authentication pattern; and
   transmitting a video stream, produced by and transmitted from the surveillance camera, to the user equipment when the user equipment is authenticated,
   wherein the authentication pattern included in the received image is an authentication pattern displayed on a display device of the user equipment to be authenticated.

2. The method of claim 1, wherein the authentication pattern includes at least one of a figure, a number, a character, a symbol, a color pattern, a black and white pattern, a code pattern, and combination thereof.

3. The method of claim 1, wherein the authentication pattern displayed on the display device of the user equipment is the authentication pattern issued by the service server to the user equipment in response to the service request message transmitted from the user equipment.

4. The method of claim 1, wherein the performing an authentication procedure comprises:
   obtaining the issued authentication pattern associated with the user equipment, which is issued by the service server to the user equipment in response to the service request message transmitted from the user equipment;
   comparing the issued authentication pattern with the authentication pattern included in the received image;
   determining whether the user equipment is authenticated based on the comparison result.

5. The method of claim 4, wherein the transmitting a video stream comprises:
   transmitting the video stream of the surveillance camera when the issued authentication pattern is matched with the authentication pattern included in the received image.

6. The method of claim 1, wherein the transmitting a video stream comprises:
   enabling the user equipment directly to control the surveillance camera for a given time period.

7. The method of claim 1, wherein the transmitting a video stream comprises:
   receiving the video stream of the surveillance camera; and
   delivering the received video stream to the user equipment for a given time period.

8. A method of using a surveillance camera by user equipment based on an authentication pattern, the method comprising:
   transmitting a service request message to a service server for monitoring a target area using at least one surveillance camera installed around the target area, wherein the service request message includes information on the target area to be monitored;
   receiving an authentication pattern from the service server in response to the service request message;
   providing the received authentication pattern to a target surveillance camera installed around the target area such that the received authentication pattern to be used for authentication of the user equipment is captured and transferred to the service server through the target surveillance camera; and receiving a video stream of capturing the target area to monitor by the target surveillance camera at least for a given time period.

9. The method of claim 8, wherein the transmitting a service request message comprises:
   receiving an input from a service requester for using the at least one of surveillance camera to monitor the target area;
   obtaining, based on the input from the service requester, information on at least one of identification of the user equipment, identification of the service requester, identification of the at least one surveillance cameras to use, a location of the user equipment, the target area to monitor, and a requested time period for monitoring;
   generating the service request message to include the obtained information; and
   transmitting the generated service request message to the service server.

10. The method of claim 8, wherein the authentication pattern includes at least one of a figure, a number, a character, a symbol, a color pattern, a black and white pattern, a code pattern, and combination thereof.

11. The method of claim 8, wherein the receiving an authentication pattern comprises:
   receiving an unavailability message from the service server when a corresponding service is not available at the target area; and
   otherwise, receiving the authentication pattern from the service server.

12. The method of claim 8, wherein the providing the received authentication pattern comprises:
   displaying the received authentication pattern on a display device of the user equipment such that the authentication pattern displayed on the display device of the user equipment is captured by the target surveillance camera.

13. The method of claim 8, wherein the receiving a video stream comprises:
   receiving the video stream of the target surveillance camera when the user equipment is authenticated by the service server based on the provided authentication pattern and the received authentication pattern.

14. The method of claim 8, wherein the receiving a video stream comprises:
   receiving the video stream of the target surveillance camera when the provided authentication pattern is matched with the received authentication pattern.

15. The method of claim 8, wherein the receiving a video stream comprises:
   receiving the video stream, captured and produced by the target surveillance camera, from the service server.

16. The method of claim 8, wherein the receiving a video stream comprises:
   receiving, directly from the target surveillance camera, the video stream produced by and transmitted by the surveillance camera.

17. The method of claim 8, wherein the receiving a video stream comprises:
   controlling the surveillance camera to capture the target area to monitor for the given time period.

* * * * *